United States Patent
Choi

(10) Patent No.: US 12,302,192 B2
(45) Date of Patent: May 13, 2025

(54) PROXIMITY ALERT SYSTEM

(71) Applicant: Uber Technologies, Inc., San Francisco, CA (US)

(72) Inventor: Yuri Choi, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/322,625

(22) Filed: May 17, 2021

(65) Prior Publication Data

US 2021/0345064 A1 Nov. 4, 2021

Related U.S. Application Data

(63) Continuation of application No. 16/271,649, filed on Feb. 8, 2019, now Pat. No. 11,012,809.

(51) Int. Cl.
*H04W 4/02* (2018.01)
*H04W 4/40* (2018.01)

(52) U.S. Cl.
CPC .......... *H04W 4/023* (2013.01); *H04W 4/027* (2013.01); *H04W 4/40* (2018.02)

(58) Field of Classification Search
CPC ....... H04W 4/023; H04W 4/027; H04W 4/40; H04W 92/18
USPC ............. 455/412.1–412.2, 414.1, 456.1–457
See application file for complete search history.

(56) References Cited

U.S. PATENT DOCUMENTS

| | | |
|---|---|---|
| 6,927,727 B2 | 8/2005 | Cleghorn |
| 7,515,065 B1 | 4/2009 | Bygrave |
| 8,427,290 B2 | 4/2013 | Davis |
| 9,049,105 B1 | 6/2015 | Feinstein |
| 9,141,582 B1 | 9/2015 | Brinkmann |
| 9,256,991 B2 | 2/2016 | Crawford |
| 9,457,754 B1 | 10/2016 | Christensen |
| 9,646,428 B1 | 5/2017 | Konrady |
| 9,881,268 B1 | 1/2018 | Briggs |
| 9,940,840 B1 | 4/2018 | Schubert |
| 9,965,960 B1 | 5/2018 | McDavitt-Van Fleet |

(Continued)

FOREIGN PATENT DOCUMENTS

| | | |
|---|---|---|
| CN | 109120497 | 1/2019 |
| JP | 6218057 | 10/2017 |
| WO | WO 2018/0149145 | 8/2018 |

OTHER PUBLICATIONS

Examination Report issued in AU 2018200646 on Apr. 16, 2018.

(Continued)

*Primary Examiner* — Michael Y Mapa
(74) *Attorney, Agent, or Firm* — Mahamedi IP Law LLP

(57) ABSTRACT

A proximity alert system tracks geographic locations of riders and drivers using global navigation satellite system receivers in their mobile devices or in a device such as a beacon or dashcam. The proximity alert system compares the location data received from the riders' and drivers' devices and determines whether a service-requesting user is within a threshold distance of one of the driver devices that does not belong to the driver assigned to provide transport service for the rider. If so, the proximity alert system can communicate a notification message to the rider to confirm whether the rider is in the correct car. The proximity alert system can also communicate a message to the driver asking the driver to double-check the identity of the rider.

24 Claims, 7 Drawing Sheets

(56) References Cited

U.S. PATENT DOCUMENTS

| | | |
|---|---|---|
| 10,049,408 B2 | 8/2018 | Carver |
| 10,102,586 B1 | 10/2018 | Marlow |
| 10,242,333 B1 | 3/2019 | Colucci |
| 10,580,291 B1* | 3/2020 | Rothenberg ............. B60Q 5/00 |
| 2001/0029425 A1 | 10/2001 | Myr |
| 2001/0049275 A1 | 12/2001 | Pierry |
| 2002/0120380 A1 | 8/2002 | Hambsch |
| 2002/0121981 A1 | 9/2002 | Munch |
| 2003/0014187 A1 | 1/2003 | Chun |
| 2003/0055983 A1 | 3/2003 | Callegari |
| 2004/0215373 A1 | 10/2004 | Won |
| 2005/0027434 A1 | 2/2005 | Hirose |
| 2006/0208169 A1 | 9/2006 | Breed |
| 2007/0272493 A1* | 11/2007 | Legez ...................... B66B 1/20 |
| | | 700/13 |
| 2008/0116680 A1 | 5/2008 | Mita |
| 2008/0255754 A1 | 10/2008 | Pinto |
| 2010/0202495 A1 | 8/2010 | Kagawa |
| 2010/0222645 A1 | 9/2010 | Nadler |
| 2010/0305857 A1 | 12/2010 | Byrne |
| 2010/0332133 A1 | 12/2010 | Harris |
| 2011/0125521 A1 | 5/2011 | Dhoble |
| 2011/0145089 A1 | 6/2011 | Khunger |
| 2011/0161227 A1 | 6/2011 | Santo, Jr. |
| 2011/0301985 A1 | 12/2011 | Camp |
| 2012/0041675 A1 | 2/2012 | Juliver |
| 2012/0095844 A1 | 4/2012 | Barnes, Jr. |
| 2012/0173136 A1 | 7/2012 | Ghoting |
| 2012/0299344 A1 | 11/2012 | Breed |
| 2013/0006469 A1 | 1/2013 | Green |
| 2013/0158742 A1 | 6/2013 | Cooper |
| 2013/0159505 A1 | 6/2013 | Mason et al. |
| 2013/0222133 A1 | 8/2013 | Schultz |
| 2013/0226926 A1 | 8/2013 | Beaurepaire |
| 2014/0067195 A1 | 3/2014 | James |
| 2014/0067490 A1 | 3/2014 | James |
| 2014/0087697 A1 | 3/2014 | Johnston |
| 2014/0172496 A1 | 6/2014 | Rosjat |
| 2014/0195102 A1 | 7/2014 | Nathanson |
| 2014/0306814 A1 | 10/2014 | Ricci |
| 2014/0306833 A1 | 10/2014 | Ricci |
| 2014/0309864 A1 | 10/2014 | Ricci |
| 2014/0310788 A1 | 10/2014 | Ricci |
| 2015/0046342 A1 | 2/2015 | Lee |
| 2015/0077244 A1 | 3/2015 | Lyman |
| 2015/0081362 A1* | 3/2015 | Chadwick ............. G06Q 50/30 |
| | | 705/7.14 |
| 2015/0087258 A1 | 3/2015 | Barnes |
| 2015/0112543 A1 | 4/2015 | Binion |
| 2015/0154711 A1 | 6/2015 | Christopulos |
| 2015/0161554 A1 | 6/2015 | Sweeney |
| 2015/0195133 A1 | 7/2015 | Sheets |
| 2015/0228000 A1 | 8/2015 | Bijor |
| 2015/0279122 A1 | 10/2015 | Lorenzen |
| 2015/0294422 A1 | 10/2015 | Carver |
| 2015/0304784 A1 | 10/2015 | Snider |
| 2015/0358677 A1 | 12/2015 | Papa |
| 2015/0371157 A1 | 12/2015 | Jaffe |
| 2016/0026936 A1 | 1/2016 | Richardson |
| 2016/0029193 A1 | 1/2016 | Iwai |
| 2016/0094964 A1 | 3/2016 | Barfield, Jr. |
| 2016/0189310 A1 | 6/2016 | O'Kane |
| 2016/0189544 A1 | 6/2016 | Ricci |
| 2016/0192166 A1 | 6/2016 | deCharms |
| 2016/0196737 A1 | 7/2016 | Martin |
| 2016/0364823 A1 | 12/2016 | Cao |
| 2017/0017927 A1 | 1/2017 | Domnick |
| 2017/0039890 A1 | 2/2017 | Truong |
| 2017/0046407 A1 | 2/2017 | Palmert |
| 2017/0053461 A1 | 2/2017 | Pal |
| 2017/0072850 A1 | 3/2017 | Curtis |
| 2017/0098377 A1 | 4/2017 | Marco |
| 2017/0103490 A1* | 4/2017 | Haparnas ............... H04W 4/023 |
| 2017/0132540 A1 | 5/2017 | Haparnas |
| 2017/0134559 A1 | 5/2017 | Shetty |
| 2017/0147959 A1 | 5/2017 | Sweeney |
| 2017/0161439 A1 | 6/2017 | Raduchel |
| 2017/0168500 A1 | 6/2017 | Bradley |
| 2017/0171730 A1 | 6/2017 | Tzirkel-Hancock |
| 2017/0178419 A1 | 6/2017 | Paridel |
| 2017/0191845 A1 | 7/2017 | Marueli |
| 2017/0193419 A1 | 7/2017 | Haparnas |
| 2017/0213160 A1 | 7/2017 | Yerli |
| 2017/0249847 A1 | 8/2017 | Marueli |
| 2017/0262659 A1 | 9/2017 | Kuris |
| 2017/0345115 A1 | 11/2017 | Haparnas |
| 2018/0017405 A1 | 1/2018 | Chen |
| 2018/0018718 A1 | 1/2018 | Childress |
| 2018/0053415 A1 | 2/2018 | Krunic |
| 2018/0091937 A1 | 3/2018 | Allen |
| 2018/0091938 A1 | 3/2018 | Allen |
| 2018/0095977 A1 | 4/2018 | Reddy |
| 2018/0096445 A1 | 4/2018 | Eyler |
| 2018/0124207 A1 | 5/2018 | Marueli |
| 2018/0130353 A1 | 5/2018 | Pandurangaro |
| 2018/0218549 A1 | 8/2018 | Wahba |
| 2018/0242375 A1 | 8/2018 | O'Herlihy |
| 2019/0051174 A1 | 2/2019 | Haque |
| 2019/0320043 A1 | 10/2019 | Goldstein |
| 2020/0065722 A1* | 2/2020 | Smith .................. H04W 4/023 |
| 2020/0260217 A1 | 8/2020 | Choi |
| 2022/0156870 A1* | 5/2022 | Jiang .................. G06Q 20/326 |

OTHER PUBLICATIONS

EESR issued in EP 18154514.6 on Apr. 17, 2018.
Office Action in CA 2,993,044 dated Dec. 4, 2018.
Office Action in AU 2019200337 dated Nov. 7, 2019.
Office Action in CA 2,993,044 dated Dec. 10, 2019.
Office Action in AU 2018220174 dated Dec. 19, 2019.
Office Action in KR 10-2019-7027032 dated Feb. 17, 2020.
First Office Action in CN 201880025003.7 dated Mar. 25, 2020.
ISR and Written Opinion in PCT/US2020/016656 dated Jun. 4, 2020.
Office Action in EP 18154514.6 dated Jun. 2, 2020.
Office Action in CA 3,054,923 dated Jun. 11, 2020.
Office Action in AU 2018220174 dated Sep. 4, 2020.
Office Action in AU 2020200316 dated Jan. 28, 2021.

* cited by examiner

PROXIMITY ALERT SYSTEM

CROSS-REFERENCE TO RELATED APPLICATION

This application is a continuation of U.S. patent application Ser. No. 16/271,649, filed Feb. 8, 2019, which application is hereby incorporated by reference in its entirety.

TECHNICAL FIELD

Examples described herein relate to a network computer system that implements a proximity alert system.

BACKGROUND

A network service can enable users to request and receive various services through applications on mobile computing devices. The network service typically selects a service provider to fulfill the request for service based on user-specified data from the request. These service providers can interact with the network service to accept or decline service requests, receive data about the requesting users, and set various status modes such as whether the provider is online and available to fulfill requests or offline.

DETAILED DESCRIPTION

Figure 1:
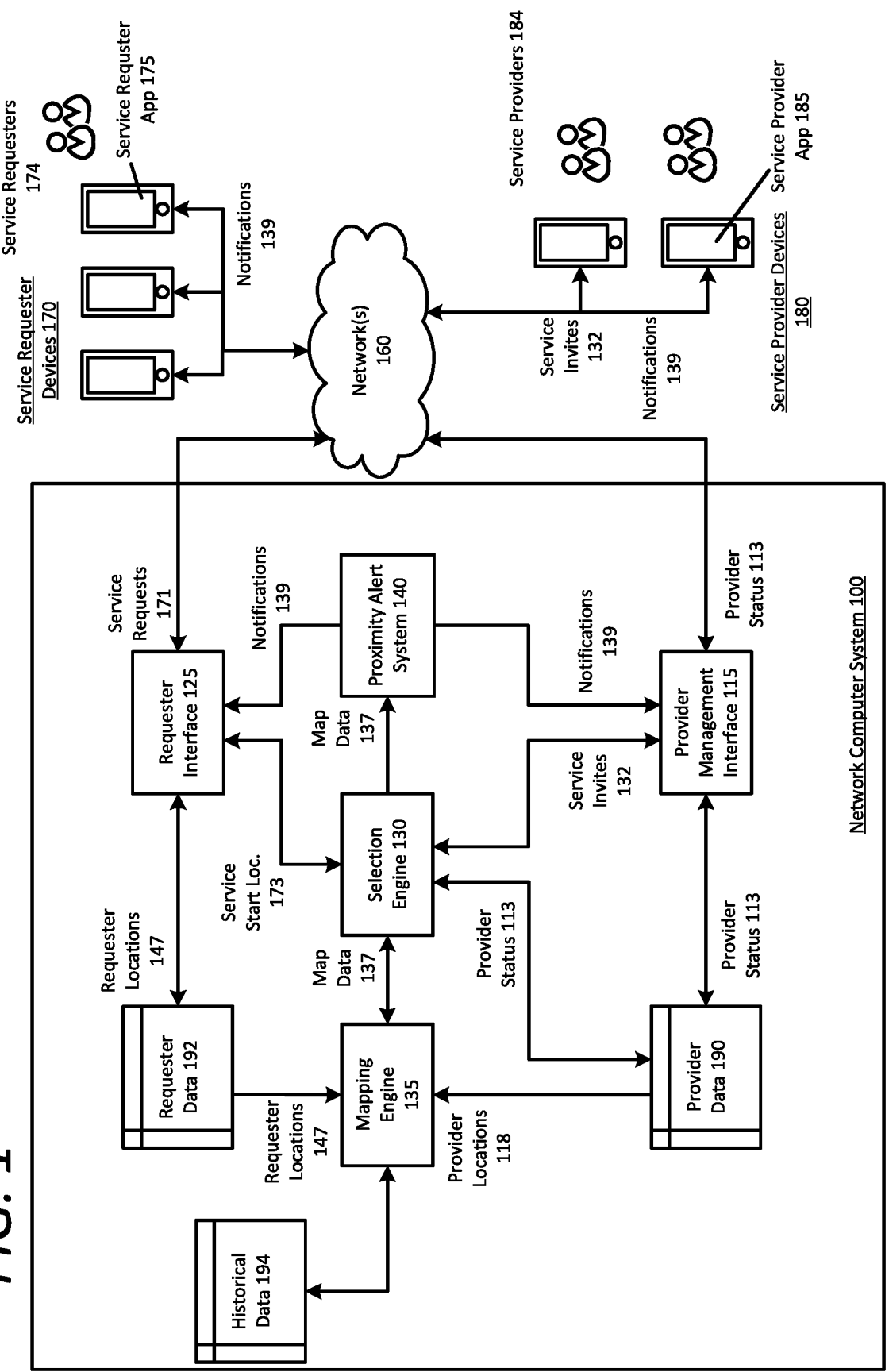
FIG. 1 illustrates an example proximity alert system, in accordance with some aspects.

A network computer system is provided herein that manages an on-demand network-based service linking available service providers with service requesters throughout a geographic region (e.g., a metroplex such as the San Francisco Bay Area). According to examples, the network computer system can receive service requests for on-demand services (e.g., transport services or delivery services) from requesting users (e.g., riders for a transport service) via a designated service requester application executing on the users' mobile computing devices. Based, at least in part, on a service start location, the network computer system can identify a number of proximate available service providers (e.g., drivers) and transmit a service invitation message to one or more service provider devices of the proximate available service providers to fulfill the service request (e.g., provide or perform the corresponding service). In many examples, the service providers can either accept or decline the invitation based on, for example, the service start location or service destination being impractical for the service provider.

In some examples, in selecting a service provider to fulfill a given service request, the network computer system can identify a plurality of candidate service providers to fulfill the service request based on a service start location indicated in the service request. For example, the network computer system can determine a geo-fence (e.g., a region specified by three or more location points or a defined area, such as a hexagon from an array of hexagons) surrounding the service start location (or a geo-fence defined by a radius away from the service start location), identify a set of candidate service providers (e.g., twenty or thirty service providers within the geo-fence), and select an optimal service provider (e.g., closest service provider to the service start location, service provider with the shortest estimated travel time from the service start location, service provider traveling to a location within a specified distance or specified travel time to the destination location, etc.) from the candidate service providers to fulfill the service request. According to examples provided herein, the network computer system can compile historical data for individual service requesters with regard to the network-based service. Thus, the network computer system can manage a service requester profile for each service requester indicating routine start and/or end locations (or regions), and/or routine routes (e.g., for a transportation service from home to work and/or vice versa) and preferred service types (e.g., transportation, delivery, mailing, etc.).

In transportation service examples, a rider-to-driver proximity alert service or system (referred to herein, as system for purposes of simplicity), which communicates with or is implemented by or as a part of the network computer system described herein, notifies riders and/or drivers (e.g., in busy pickup areas) when the rider may have entered the wrong vehicle or is progressing towards an incorrect vehicle. The system tracks the location of riders who are waiting for a driver to arrive; the system also tracks the location of drivers who have accepted a request to pick up a rider. Based on these locations, the system can notify the rider and/or the driver when there may be a mismatch, among other features.

Among other benefits, the proximity alert system results in efficiency improvements to the network computer system, including fewer wrong rider pick ups, fewer customer service support tickets for wrong rider pick ups, reduced direct messaging between rider and driver, and an increase in rider safety for the transportation service. Potential mismatch notifications provided to riders and drivers can improve the user interface experience of the service application running on the users' mobile devices as well as provide additional functionality in the form of more convenient and reliable methods of reporting and avoiding mistakes made during the transportation service. The features provided by the proximity alert system can also streamline aspects of the transportation service, thereby reducing the necessary processing and memory resources consumed by the network computer system.

In one aspect, the proximity alert system tracks geographic locations of riders and drivers using global navigation satellite system (e.g., GPS) receivers in their mobile devices or in a device such as a beacon or dashcam. The proximity alert system compares the location data received from the riders' and drivers' devices and determines whether a service-requesting user is within a threshold distance of one of the driver devices that does not belong to the driver assigned to provide transport service for the rider. If so, the proximity alert system can communicate a notification message to the rider to confirm whether the rider is in the correct car. The proximity alert system can also communicate a message to the driver asking the driver to double-check the identity of the rider.

In some examples, the threshold is a predetermined distance (e.g., a 10 foot radius circle) from the geographic location of a rider or driver, and the proximity alert system determines whether there are any overlaps between these circles to estimate whether a rider has entered the driver's vehicle. If an overlap occurs between a rider and driver who are not matched in the transport arrangement system, the proximity alert system can communicate the notifications to the rider and/or driver. In other examples, the threshold distance can be determined dynamically. For example, the threshold distance can be the current distance between the geographic location of the user device of the user and the geographic location of the provider device of the driver.

In another aspect, the proximity alert system can determine whether a rider is leaving the area in an incorrect vehicle based on changing GPS locations over time that indicate the rider is in a moving vehicle. If the rider is moving as if in a vehicle and the driver matched with the rider is not moving, the system can notify the rider device and/or the driver device of the error. In addition, if there is a driver being tracked in the network computer system that overlaps with the rider, the system can notify that driver that they have the wrong rider. The system can also notify the correct driver that the passenger they're waiting for has left the area in the wrong vehicle.

In one aspect, the notification is displayed on the service application executed on the user device, and the notification prompts the rider to confirm that they are in the vehicle of the correct driver.

In another aspect, as the GPS location for the rider gets closer to the driver's, the service application on the user device can provide the rider with a cue, such as an increasing vibration or louder sound, that the rider is heading in the right direction.

In a further aspect, the proximity alert system determines a user movement speed of the service-requesting user based on changes in the geographic location of the user over a period of time. The proximity alert system also determines a provider movement speed of the driver based on changes in the geographic location of the driver over the period of time. Upon determining that the user movement speed is different than the provider movement speed by a threshold amount, the proximity alert system transmits a notification to the user device of the user. In some examples, upon determining that the user movement speed is above a first speed threshold and the provider movement speed is below a second speed threshold, the proximity alert system can transmit a notification to the user device of the rider or the driver.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates an example proximity alert system, in accordance with some aspects. The network computer system 100 can implement or manage a network service (e.g., an on-demand transport or delivery arrangement service) that connects service requesters 174 with service providers 184 that are available to fulfill the service requests 171 that service requesters 174 transmit to the network computer system 100. The network service can enable services to be requested by service requesters 174 and provided by available service providers 184 by way of a service requester application 175 executing on the service requester devices 170, and a service provider application 185 executing on the service provider devices 180. As used herein, service requester devices 170 and service provider devices 180 can comprise computing devices with functionality to execute designated applications corresponding to the on-demand arrangement service managed by the network computer system 100. In many examples, service requester devices 170 and service provider devices 180 are mobile computing devices, such as smartphones, tablet computers, virtual reality or augmented reality headsets, on-board computing systems of vehicles, and the like. Example network services include delivery of food or products, package mailing, shopping, construction, plumbing, home repair, housing or apartment sharing, as well as transportation arrangement services.

The network computer system 100 can include a provider management interface 115 to communicate over one or more networks 160 with the service provider application 185 running on service provider devices 180. According to examples, service providers 184 register with the network computer system 100 to receive service invitations 132 through the service provider application 185 to fulfill service requests 171 submitted by the service requesters 174. In an example using transport services, the service requesters 174 are prospective passengers who want to be picked up and transported to a destination, and the service providers 184 are drivers of personal vehicles who transport the service requesters 174 to their destinations.

Service providers 184 can select various states or modes within the service provider application 185, such as an online mode that indicates the service provider 184 is available and willing to fulfill service invitations 132. Service providers 184 can also select from various types of transport services that the provider offers, including ride-pooling, a basic ride-share service type, a luxury vehicle service type, etc.

In accordance with various examples, the service provider device 180 transmits a provider status 113, which can include any selected modes, the current location of the service provider 184, and other provider information, over the network 160 to the provider management interface 115. In some implementations, the service provider devices 180 can determine the current location of the service provider 184 using location-based resources of the service provider devices 180 (e.g., global positioning system (GPS) resources). The service provider application 185 can continually update the provider status 113 on a regular schedule or in response to provider input to the service provider device 180, location changes determined by GPS, service steps performed, etc. The provider management interface 115 stores the provider status 113 in a provider data store 190 (e.g., a database or data structure) accessible by a selection engine 130 that processes incoming service requests 171 in order to select service providers 184 to fulfill the service requests 171.

The network computer system 100 can include a service requester interface 125 to communicate with service requester devices 170 over one or more networks 160 via a service requester application 175. According to examples, a service requester 174 wishing to utilize the on-demand arrangement service can launch the service requester application 175 and transmit a service request 171 over the network 160 to the network computer system 100. In certain implementations, the service requester 174 can view multiple different service types managed by the network computer system 100, such as ride-pooling, a basic ride-share service type, a luxury vehicle service type, a van or large vehicle service type, professional services (e.g., where the service provider is certified), an on-demand self-driving vehicle service, and the like. The network computer system 100 can utilize service provider locations to provide the service requester devices 170 with estimated time to arrival (ETA) data of proximate service providers 184 for each respective service. In one implementation, the service requester application 175 can enable the service requester 174 to scroll through each service type. In response to a soft selection of a particular service type, the network computer system 100 can provide ETA data on a user interface of the service requester application 175 that indicates an ETA of the closest service provider 184 for the service type and/or the locations of all proximate available service providers 184 for that service type. As the service requester 174 scrolls through each service type, the user interface can update to show visual representations of the service providers 184 for that service type on a map centered on the service requester 174 or a chosen service start location 173. The service requester 174 can interact with the user interface of the service requester application 175 to select a particular service type and transmit a service request 171.

In some examples, the service request 171 can include a service start location 173 within a given region (e.g., a metropolitan area managed by one or more datacenters corresponding to the network computer system 100) where a matched service provider is to rendezvous with the service requester 174. The service requester 174 can input the service start location 173 by setting a location pin on a user interface of the service requester application 175, or the service start location 173 can be determined by a current location of the service requester 174 (e.g., utilizing location-based resources of the service requester device 170). Additionally, the service requester 174 can input a service destination 172 during or after submitting the service request 171. In an example using transport services, the service requester 174 is a prospective passenger that wants to be picked up at the service start location 173 and dropped off at a destination.

The network computer system 100 can include a mapping engine 135, or can utilize a third-party mapping service, to generate map data 137 and or traffic data in the environment surrounding the service start location 173. The mapping engine 135 can retrieve service provider locations 118 from the provider data store 190 and requester locations 147 from the requester data store 192. The mapping engine 135 can include the locations in the map data 137. The selection engine 130 can utilize the map data 137 in order to select an optimal service provider to fulfill the service request 171. As provided herein, the optimal service provider can be a provider that is closest to the service requester 174 with respect to distance or time, or can be a proximate provider that is optimal for other reasons, such as the provider's experience, the amount of time the provider has been on the clock, the provider's current earnings, and the like.

Once the optimal service provider is selected, the selection engine 130 can generate a service invitation 132 to fulfill the service request 171 and transmit the service invitation 132 to the optimal service provider's device via the service provider application 185. In addition to the service invitation 132, the network computer system 100 can transmit requester information 147, such as a name and photograph of the service requester 174, from the requester data store 192. Upon receiving the service invitation 132, the optimal service provider can either accept or reject the invitation 132. Rejection of the invitation 132 can cause the selection engine 130 to determine another service provider from the candidate set of service providers 184 to fulfill the service request 171. However, if the optimal service provider accepts (e.g., via an acceptance input), then the acceptance input is transmitted back to the selection engine 130, which generates and transmits a confirmation of the optimal service provider to the service requester 174 via the service requester application 175 on the service requester device 170.

In some aspects, the network computer system 100 includes a proximity alert system 140 to assist service requesters 174 in finding the correct vehicle of the service provider 184 that they are matched with in busy areas that may include many requesters and providers in close proximity. In some implementations, the proximity alert system 140 can determine that an area is busy if there are more than a threshold number of requesters and providers per unit area (e.g., more than ten of either group within 1000 square feet). Accordingly, the proximity alert system 140 can operate in areas that are determined to be busy, or in other implementations, the proximity alert system 140 can operate regardless of whether any individual area is busy or not.

The proximity alert system 140 uses the map data 137, which includes location data for the geographic locations of each of the service requesters 174 and service providers 184 known to the network service, in order to determine proximities.

In some aspects, the geographic locations correspond to location data received from the service requester devices 170 and service provider devices 180, which include mobile phones as well as devices linked to a particular vehicle, such as a stand-alone beacon device placed in the vehicle or a vehicle-based infotainment or navigation system. The location data can be latitude and longitude coordinates determined by a single method or combination of methods, including the use of global navigation satellite system units, cellular triangulation, and WiFi location techniques, among others.

In other aspects, the network computer system 100 can determine the geographic locations of service requesters 174 and service providers 184 based on data received from the service requester devices 170 and service provider devices 180 that indicates the relative location of a specific device to another. For example, a device can detect other nearby devices using frequency identification (RFID), near field communication (NFC), and/or Bluetooth. The device can send data corresponding to these other devices to the network computer system 100, which can use the data in combination with other data (e.g., coordinates of the detected nearby devices or other devices) to determine the geographic location of the device in question, which may be in terms of latitude and longitude coordinates. Alternatively or in addition, the device can use technologies like RFID, NFC, and Bluetooth to determine distance to other devices without a global reference frame.

Using the map data 137 and/or other data provided by the selection engine 130 or other components of the network computer system 100, the proximity alert system 140 tracks or periodically monitors the geographic locations of service requesters 174 and service providers 184. In some implementations, the proximity alert system 140 only tracks or monitors service requesters 174 that have submitted a service request 171 and service providers 184 who have accepted a service invite 132. The proximity alert system 140 can also individually track different local regions that may be geo-fenced as part of a larger geographic region served by the network service.

In one aspect, the proximity alert system 140 compares the geographic locations of service requesters 174 and service providers 184 to determine their locations relative to one another. For example, the proximity alert system 140 can use geographic location coordinates to determine a cartesian distance between each service requester 174 and each service provider 184. In some implementations, the proximity alert system 140 limits its comparison to requesters and providers in the same geo-fenced region.

When the proximity alert system 140 determines that a service requester 174 is within a threshold distance (e.g., 10 feet) of one of the service providers 184, the proximity alert system 140 checks whether the service requester 174 and that service provider 184 are matched through a service request 171 in the network service. For example, in scenarios involving personal transport, when a rider who submitted a service request 171 is near a driver or the driver's vehicle, the proximity alert system 140 checks whether the nearby driver is the driver assigned to transport the rider as part of the network service. If not, the proximity alert system 140 transmits a notification 139 to the service requester 174 and/or the service provider 184.

In other aspects, the proximity alert system 140 can determine the distance between a given service requester 174 and the service provider 184 who is matched to that requester. The proximity alert system 140 can then use that distance to determine whether to transmit notifications. In one implementation, that distance is used as the threshold distance so that notifications are only sent when a service requester 174 is closer to a different service provider 184 than the correct provider assigned to the requester's service request 171. The threshold distance may also be chosen as the lesser of a predetermined value (e.g., 10 feet) and the distance between the service requester 174 and the matching service provider 184 so that notifications are only sent when a service requester 174 is detected as being near a different, non-matching service provider 184 while at the same time not being even nearer to the correct, matching service provider 184.

In addition or as an alternative, for services that involve more than one service requester 174 per vehicle (e.g., a shared or pooled ride), the proximity alert system 140 can determine the distance between the given service requester 174 and any other service requesters 174 who are already in the vehicle belonging to the service provider 184 who is matched to that requester. Based on the current provider status 113 and service statuses of their requests, the network computer system 100 can determine that a given service request 171 is assigned to a service provider 184 that has one or more riders who have been previously picked up and not dropped off. Thus, the proximity alert system 140 can compare the distance between the given service requester 174 and those riders to the threshold distance in order to determine whether the given service requester 174 is in the correct vehicle or not. For example, the proximity alert system 140 may determine that a service requester 174 is in the correct vehicle when they are within a threshold distance of both the matching service provider 184 and at least one of the other riders in the correct vehicle. Similarly, the proximity alert system 140 may determine that a service requester 174 is in an incorrect vehicle if the service requester 174 is within a threshold distance of multiple parties in a pooled ride that does not match the service requester 174.

In one aspect, based on the distances determined from the location data, the proximity alert system 140 generates a notification 139 to the service requester 174 indicating that the service requester 174 may have entered or be about to enter a vehicle belonging to someone other than the correct service provider 185 who is assigned to the requester's service request 171. The network computer system 100 can transmit the notification 139 over the network 160 to the service requester device 170 to cause the service requester application 175 to display a notification message on the user interface of the application. In some examples, the message can inform the service requester 174 that they may have entered or be about to enter an incorrect vehicle and that they should confirm whether or not this is the case. For example, the message may ask the rider "Are you sure you're in the right car?" The message can also include details of the service request 171 that the service requester 174 can use as part of the confirmation process, including the name of the service provider 184, a photo of the service provider 184, and vehicle details such as the make, model, color, and license plate number of the vehicle. In addition to the notification message, the service requester application 175 can display an interactive prompt that allows the service requester 174 to select whether or not they have entered an incorrect vehicle.

In other aspects, the network computer system 100 can transmit the notification 139 as a text message instead of or in addition to the in-app notification message. The text message can include the same details as the in-app message, and it can include a directive to the service requester 175 to reply to the text message with a programmed code word if they determine that they have entered an incorrect vehicle.

If the service requester 174 indicates that no mistake has occurred, the service requester application 175 can log the false alarm and transmit the log back to the network computer system 100. In situations where the service requester 174 requests a ride for another party, such as a friend or family member, the proximity alert system 140 can disregard the location of the service requester 174 and refrain from transmitting proximity alert notifications 139. The service requester 174 can indicate within the service requester application 175 that a service request 171 is for another party and also dismiss, override, or turn off any proximity alert notifications 139 the requester may receive. If the service request 171 identifies a rider who has a mobile device running the service requester application 175 (e.g., by looking up account information for a user name or telephone number in the requester data store 192), the network computer system 100 can receive the rider's location, through the service requester application 175 running on their device, to calculate the appropriate distances. In addition, the proximity alert system 140 can transmit any proximity alert notifications 139 to the rider instead of the original service requester 174.

When the service requester 174 indicates that they have entered an incorrect vehicle, the service requester device 170 transmits, either through an application programming interface or a text message, that indication back to the network computer system 100 for processing. In one implementation, in response to receiving the indication that the rider has the wrong vehicle, the network computer system 100 can transmit another notification 139 to the incorrectly-matched service provider 184 informing them that the person in or near their vehicle may not be the passenger they are supposed to pick up. The notification 139 sent to the service provider 184 can also include details of the service request 171 that the service provider 184 can use as part of a second confirmation process, including the name of the service requester 174 and a photo of the service requester 174.

The service requester application 175 can display a list of remedial actions that the service requester 174 can take, including canceling the service request 171 or notifying the appropriate authorities if necessary. In addition, the service provider application 185 can display a list of remedial actions, which may also include canceling the service request 171 or notifying the appropriate authorities if necessary. The lists of remedial actions can also include an option for the parties to indicate that the situation has been resolved. If the network computer system 100 receives indications from both parties that the situation has been resolved, then the service request 171 can continue.

In some implementations, rather than notifying the service requester 174 first, the proximity alert system 140 generates notifications 139 for both the service requester 174 and service provider 184 so that they can mutually determine whether or not a mistake has occurred. If both parties indicate that no mistake has occurred or that any mistake has been remedied, then the service request 171 can continue.

In one aspect, the proximity alert system 140 increases the ease of users of a transport service finding the correct vehicles through the use of distance cues. The service requester application 175 can provide distance cues to the service requester 174 based on the distance between service requester 174 and the matching service provider 184 for the service request 171. The proximity alert system 140 can generate distance notifications 139 based on the determined distance between the two parties of the service request 171, and the network computer system 100 can transmit the distance notifications 139 to the service requester device 170. Depending on the distance from the service requester 174 to the matching service provider 184, the distance cues can be made more or less intense. For example, the distance cue may be an audible beep that gets louder as the service requester 174 approaches the vehicle of service provider 184. Other distance cues can include sounds that become more frequent, a flashing light, different colored lights, etc. The service requester 174 can use the service requester application 175 to disable the distance cues. The distance cues can also be programmed to cease after a predetermined amount of time has elapsed once the service requester 174 has reached the correct vehicle.

In another aspect, the proximity alert system 140 attempts to determine whether a rider/driver mismatch has occurred based on relative movement speeds between the two parties. The proximity alert system 140 tracks or periodically monitors the geographic locations of service requesters 174 and service providers 184 over time in order to determine their respective movement speeds. After the service provider 185 arrives at the designated pick up location, it is expected that neither party will move very quickly until the rider is in the vehicle, after which point both parties should move at substantially identical speeds.

Once the proximity alert system 140 determines that the service requester 174 and service provider 184 are at the service start location 173, the proximity alert system monitors the movement speeds of both parties. Upon determining that the service requester 174 movement speed is different than the service provider 184 movement speed by a threshold amount (e.g., 20 miles per hour), the proximity alert system 140 generates a notification 139 to the service requester 174 indicating that the service requester 174 may be riding in a vehicle belonging to someone other than the correct service provider 185 who is assigned to the requester's service request 171. The network computer system 100 can transmit the notification 139 over the network 160 to the service requester device 170 to cause the service requester application 175 to display a notification message on the user interface of the application. In some examples, the message can inform the service requester 174 that they may be riding in an incorrect vehicle and that they should confirm whether or not this is the case. For example, the message may ask the rider "Are you sure you're in the right car?" The message can also include details of the service request 171 that the service requester 174 can use as part of the confirmation process, including the name of the service provider 184, a photo of the service provider 184, and vehicle details such as the make, model, color, and license plate number of the vehicle. In addition to the notification message, the service requester application 175 can display an interactive prompt that allows the service requester 174 to select whether or not they have entered an incorrect vehicle.

If the service requester 174 indicates that no mistake has occurred, the service requester application 175 can log the false alarm and transmit the log back to the network computer system 100.

When the service requester 174 indicates that they are riding in an incorrect vehicle, the service requester device 170 transmits, either through an application programming interface or a text message, that indication back to the network computer system 100 for processing. In one implementation, in response to receiving the indication that the rider has the wrong vehicle, the network computer system 100 can transmit another notification 139 to the incorrectly-matched service provider 184 informing them that the person in their vehicle may not be the passenger they were supposed to pick up. The notification 139 sent to the service provider 184 can also include details of the service request 171 that the service provider 184 can use as part of a second confirmation process, including the name of the service requester 174 and a photo of the service requester 174.

The service requester application 175 can display a list of remedial actions that the service requester 174 can take, including canceling the service request 171 or notifying the appropriate authorities if necessary. If a mistake has occurred, the service provider application 185 can direct the driver of the vehicle to return the service requester 174 to the service start location 173 so that the service requester 174 can get in the correct vehicle and the driver can pick up the correct passenger. In addition, the network computer system 100 can send notifications 139 explaining any potential delays to other affected parties. The service requester application 175 may also allow the other affected parties to cancel their service request 171 without penalty. For example, the network computer system 100 can send a notification 139 to the correct service provider 184 informing them that their rider got into the wrong vehicle and/or a notification 139 to the service requester 174 that driver was supposed to pick up informing them that their driver picked up the wrong passenger.

In some implementations, the proximity alert system 140 can start a timer upon determining that a remedial action should be taken. For example, if a rider is detected as being in the wrong vehicle and the vehicle left with the rider, the timer can run until the service provider 184 returns with the rider to the service start location 173. As another example, if a service provider 184 indicates that an incorrect service requester 174 is in their vehicle and the stationary vehicle has not left the service start location 173, the timer can run until the service requester 174 leaves the vehicle, which the proximity alert system 140 can determine based on the distance between the two parties exceeding a threshold or the service provider 184 indicating on the service provider application 185 that the rider has left. Instead, if the timer exceeds a programmed duration, the network computer system 100 can perform further remedial actions, such as transmitting a warning, applying a rating penalty or fee to the uncooperative party, or notifying the appropriate authorities if necessary.

According to examples provided herein, the network computer system 100 can include a content engine that manages the manner in which content is displayed on the service requester devices 170 and/or the service provider devices 180. Regarding the service requester devices 170, the content engine can provide content updates based on user inputs on a user interface generated by the service provider application 185. For example, a user selection on a content feature of the service provider application 185 can cause the content engine to generate a new screen on the service provider application 185 or cause a current screen to pivot between certain displayed features. The content engine can also include notification messages and user interface features to display, within the service requester application 175, the notifications 139 generated by the proximity alert system 140 and receive user selections of responses to the notifications 139.

In various implementations, the requester data store 192 can store service requester profiles specific to the individual users of the on-demand service. Such information can include user preferences of service types, routine routes, service start locations 173 and service destinations, work addresses, home addresses, addresses of frequently visited locations (e.g., a gym, grocery store, mall, local airport, sports arena or stadium, concert venue, local parks, and the like). In addition, the provider data store 190 can store service provider profiles indicating information specific to individual providers and vehicles, such as vehicle type, license plate number, service qualifications, earnings data, and provider experience. The network computer system 100 can also include a historical data store 194 to store data regarding service requester and service provider liquidity for a given area, that is, how often a new service provider 184 is expected to make themselves available for on-demand services in the area.

Figure 2:
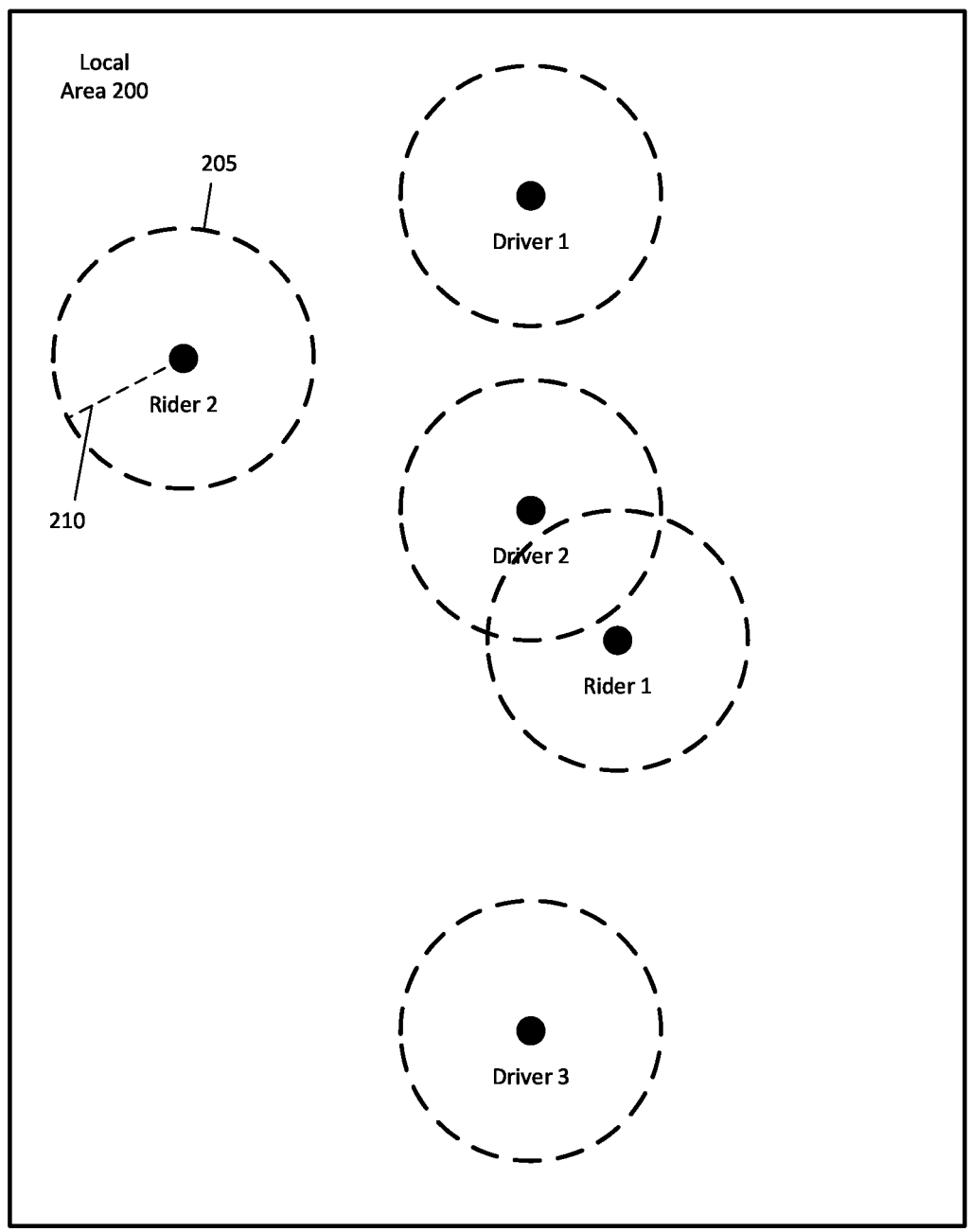
FIG. 2 illustrates an example area in which the proximity alert system can be used to alert requesting riders and providing drivers of possible mismatches.

FIG. 2 illustrates an example area in which the proximity alert system 140 can be used to alert requesting riders and providing drivers of possible mismatches. In the example illustrated, a network computer system 100 is periodically receiving the geographic locations of three drivers and two riders in local area 200. In this example, driver 1 is assigned to pick up and transport rider 1, and driver 2 is assigned to pick up and transport rider 2.

In one aspect, the proximity alert system 140 compares the geographic locations of the riders and drivers to determine their locations relative to one another. For example, the proximity alert system 140 can use geographic location coordinates and a threshold radius 210 around each of the riders to determine whether a circle 205 around that rider overlaps with the circles around any of the drivers in the local area 200. If so, the proximity alert system 140 checks whether the overlapping rider and driver are paired through a service request 171 in the network service. If they are not, the proximity alert system 140 transmits a notification 139 to the rider and/or the driver warning them of the possible mismatch and prompting them to confirm whether they are paired correctly.

For example, as illustrated, driver 2 is within the threshold radius of rider 1 even though driver 2 is assigned to pick up a different rider and rider 1 is assigned to ride with a different driver. Rider 1 may already be in the vehicle belonging to driver 2, or rider 1 may be about to enter the vehicle. In either case, the proximity alert system 140 detects this example as a possible mismatch and generates a notification 139 to rider 1 informing them that they may have entered or be about to enter an incorrect vehicle and that they should confirm whether or not this is the case. For example, the message may ask the rider "Are you sure you're in the right car?" The message can also include details of the service request 171 that rider 1 can use as part of the confirmation process, including the name of driver 1, a photo of driver 1, and vehicle details such as the make, model, color, and license plate number of driver 1's vehicle. In addition to the notification message, the service requester application 175 can display an interactive prompt that allows rider 1 to select whether or not they have entered an incorrect vehicle.

In the example illustrated, one or both of rider 1 and driver 2 should recognize the mismatch once prompted. In some aspects, the service requester application 175 can display a list of remedial actions that rider 1 can take, including canceling the service request 171 or notifying the appropriate authorities if necessary. In addition, the service provider application 185 can display a list of remedial actions, which may also include canceling the service request 171 or notifying the appropriate authorities if necessary. The lists of remedial actions can also include an option for the parties to indicate that the situation has been resolved. If the network computer system 100 receives indications from both parties that the situation has been resolved, then the service request 171 can continue (i.e., rider 1 should look for driver 1, and driver 2 should wait for rider 2 to approach).

Methodology

Figure 3:
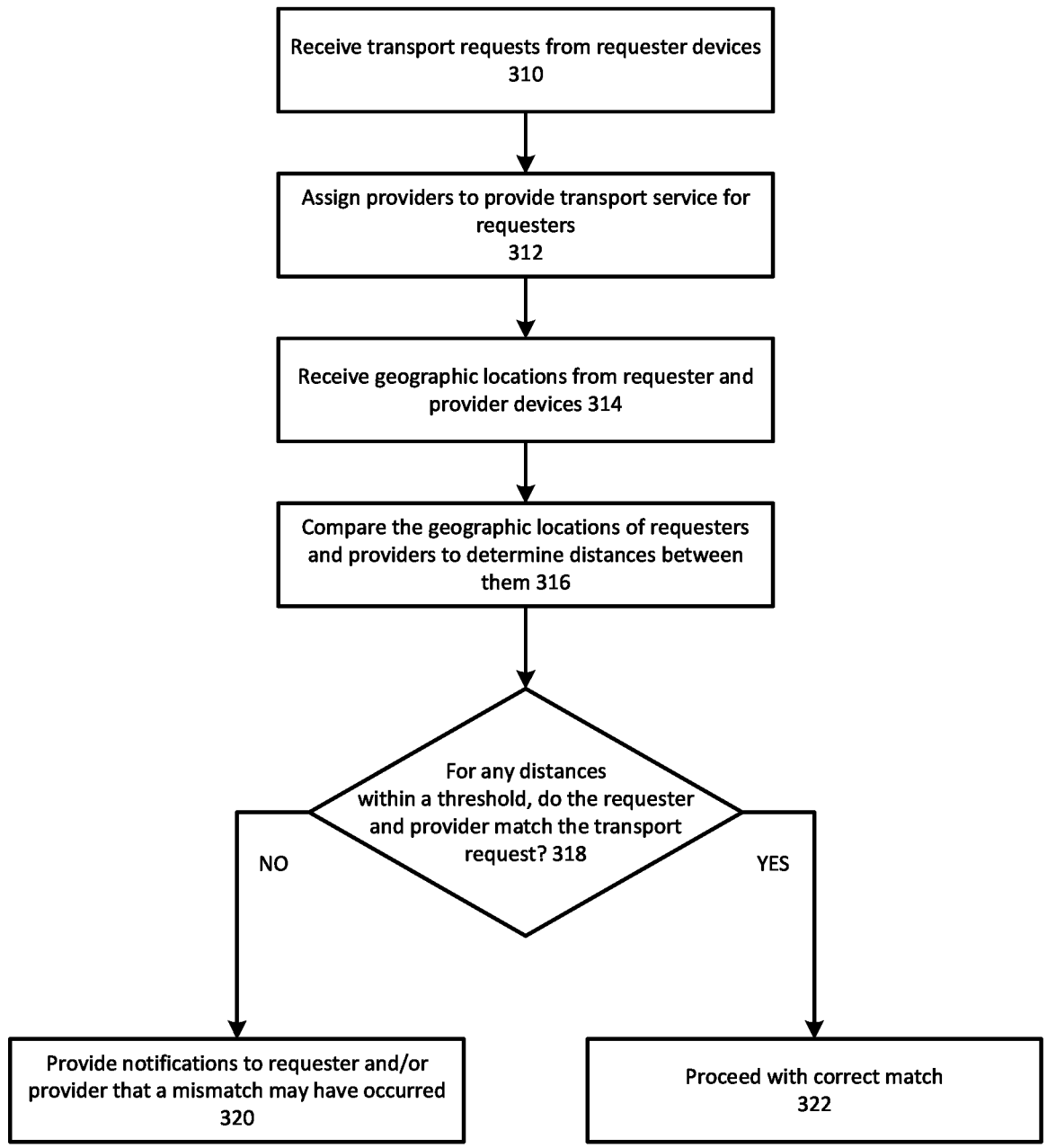
FIG. 3 illustrates an example method for providing notifications upon detecting a location mismatch between a requester and provider, according to one or more examples.
Figure 4:
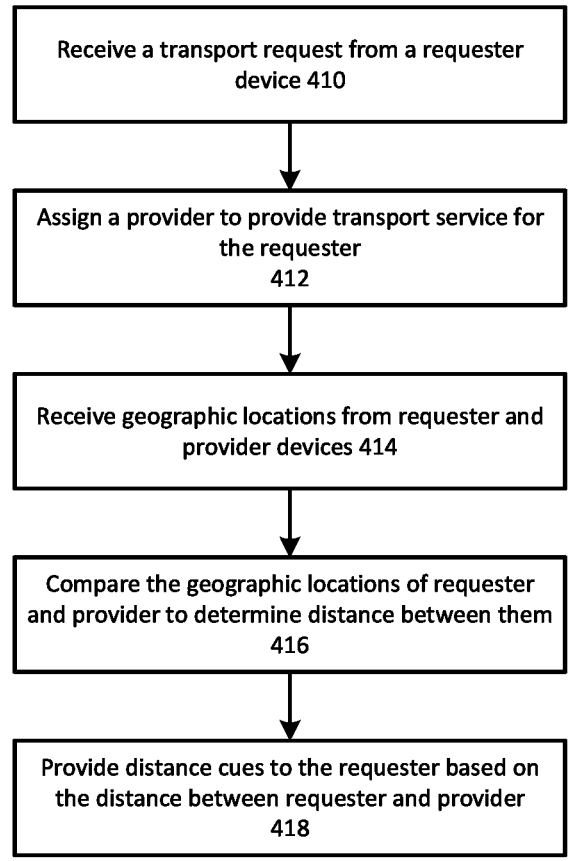
FIG. 4 illustrates an example method for providing proximity alerts to a requester, according to one or more examples.
Figure 5:
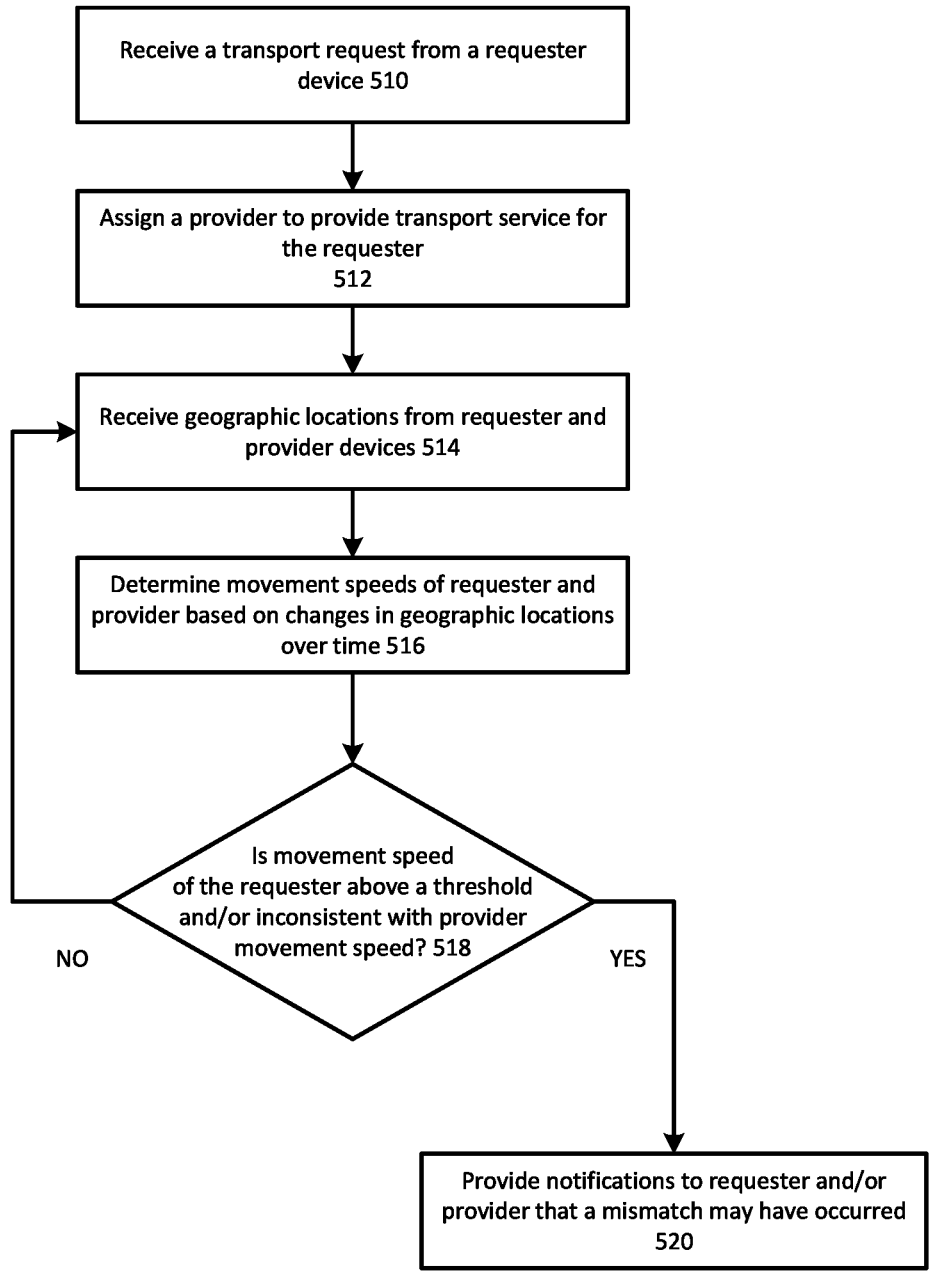
FIG. 5 illustrates an example method for providing notifications upon detecting a movement speed mismatch between a requester and provider, according to one or more examples.

FIG. 3 illustrates an example method for providing notifications upon detecting a location mismatch between a requester and provider, according to one or more examples. FIG. 4 illustrates an example method for providing proximity alerts to a requester, according to one or more examples. FIG. 5 illustrates an example method for providing notifications upon detecting a movement speed mismatch between a requester and provider, according to one or more examples. While operations of the methods and algorithms are described below as being performed by specific components, modules or systems of the network computer system 100, it will be appreciated that these operations need not necessarily be performed by the specific components identified, and could be performed by a variety of components and modules, potentially distributed over a number of machines. Accordingly, references may be made to elements of the network computer system 100 for the purpose of illustrating suitable components or elements for performing a step or sub step being described. Alternatively, at least certain ones of the variety of components and modules described in network computer system 100 can be arranged within a single hardware, software, or firmware component. It will also be appreciated that some of the steps of this method may be performed in parallel or in a different order than illustrated.

With reference to an example of FIG. 3, a network computer system 100 receives transport service requests from a number of requester devices (310). In some examples, the service request 171 can include a service start location 173 within a given region (e.g., a metropolitan area managed by one or more datacenters corresponding to the network computer system 100) where a matched service provider is to rendezvous with the service requester 174. The service requester 174 can input the service start location 173 by setting a location pin on a user interface of the service requester application 175, or the service start location 173 can be determined by a current location of the service requester 174 (e.g., utilizing location-based resources of the service requester device 170). Additionally, the service requester 174 can input a service destination 172 during or after submitting the service request 171. In an example using transport services, the service requester 174 is a prospective passenger that wants to be picked up at the service start location 173 and dropped off at a destination.

For each transport request, the network computer system 100 can generate a service invitation 132 to fulfill the service request 171 and transmit the service invitation 132 to devices of service providers. In addition to the service invitation 132, the network computer system 100 can transmit requester information 147, such as a name and photograph of the service requester 174. Once a service provider 184 accepts the service invitation 132, then the acceptance input is transmitted back to network computer system 100, which generates and transmits a confirmation of the matched service provider 184 to the service requester 174 via the service requester application 175 on the service requester device 170 (312).

In some aspects, the network computer system 100 includes a proximity alert system 140 to assist service requesters 174 in finding the correct vehicle of the service provider 184 that they are matched with in busy areas that may include many requesters and providers in close proximity. The proximity alert system 140 uses map data, which includes location data for the geographic locations of each of the service requesters 174 and service providers 184 known to the network service, in order to determine proximities.

In some aspects, the geographic locations correspond to location data received from the service requester devices 170 and service provider devices 180, which include mobile phones as well as devices linked to a particular vehicle, such as a stand-alone beacon device placed in the vehicle or a vehicle-based infotainment or navigation system (314). The location data can be latitude and longitude coordinates determined by a single method or combination of methods, including the use of global navigation satellite system units, cellular triangulation, and WiFi location techniques, among others.

In one aspect, the proximity alert system 140 compares the geographic locations of service requesters 174 and service providers 184 to determine their locations relative to one another (316). For example, the proximity alert system 140 can use geographic location coordinates to determine a cartesian distance between each service requester 174 and each service provider 184. In some implementations, the proximity alert system 140 limits its comparison to requesters and providers in the same geo-fenced region.

When the proximity alert system 140 determines that a service requester 174 is within a threshold distance (e.g., 10 feet) of one of the service providers 184, the proximity alert system 140 checks whether the service requester 174 and that service provider 184 are matched through a service request 171 in the network service (318). For example, in scenarios involving personal transport, when a rider who submitted a service request 171 is near a driver or the driver's vehicle, the proximity alert system 140 checks whether the nearby driver is the driver assigned to transport the rider as part of the network service. If not, the proximity alert system 140 transmits a notification 139 to the service requester 174 and/or the service provider 184 informing them that a mismatch may have occurred (320). If the rider and driver are correctly matched in the network service, the service request can proceed (322).

With reference to an example of FIG. 4, a network computer system 100 receives a transport service request from a requester device (410). In some examples, the service request 171 can include a service start location 173 within a given region (e.g., a metropolitan area managed by one or more datacenters corresponding to the network computer system 100) where a matched service provider is to rendezvous with the service requester 174. The service requester 174 can input the service start location 173 by setting a location pin on a user interface of the service requester application 175, or the service start location 173 can be determined by a current location of the service requester 174 (e.g., utilizing location-based resources of the service requester device 170). Additionally, the service requester 174 can input a service destination 172 during or after submitting the service request 171. In an example using transport services, the service requester 174 is a prospective passenger that wants to be picked up at the service start location 173 and dropped off at a destination.

For each transport request, the network computer system 100 can generate a service invitation 132 to fulfill the service request 171 and transmit the service invitation 132 to devices of service providers. In addition to the service invitation 132, the network computer system 100 can transmit requester information 147, such as a name and photograph of the service requester 174. Once a service provider 184 accepts the service invitation 132, then the acceptance input is transmitted back to network computer system 100, which generates and transmits a confirmation of the matched service provider 184 to the service requester 174 via the service requester application 175 on the service requester device 170 (412).

In some aspects, the network computer system 100 includes a proximity alert system 140 to assist service requesters 174 in finding the correct vehicle of the service provider 184 that they are matched with in busy areas that may include many requesters and providers in close proximity. The proximity alert system 140 uses map data, which includes location data for the geographic locations of each of the service requesters 174 and service providers 184 known to the network service, in order to determine proximities.

In some aspects, the geographic locations correspond to location data received from the service requester devices 170 and service provider devices 180, which include mobile phones as well as devices linked to a particular vehicle, such as a stand-alone beacon device placed in the vehicle or a vehicle-based infotainment or navigation system (414). The location data can be latitude and longitude coordinates determined by a single method or combination of methods, including the use of global navigation satellite system units, cellular triangulation, and WiFi location techniques, among others.

In one aspect, the proximity alert system 140 compares the geographic locations of service requesters 174 and service providers 184 to determine their locations relative to one another (416). For example, the proximity alert system 140 can use geographic location coordinates to determine a cartesian distance between each service requester 174 and each service provider 184. In some implementations, the proximity alert system 140 limits its comparison to requesters and providers in the same geo-fenced region.

In one aspect, the proximity alert system 140 increases the ease of users of a transport service finding the correct vehicles through the use of distance cues. The service requester application 175 can provide distance cues to the service requester 174 based on the distance between service requester 174 and the matching service provider 184 for the service request 171 (418). The proximity alert system 140 can generate distance notifications 139 based on the determined distance between the two parties of the service request 171, and the network computer system 100 can transmit the distance notifications 139 to the service requester device 170. Depending on the distance from the service requester 174 to the matching service provider 184, the distance cues can be made more or less intense. For example, the distance cue may be an audible beep that gets louder as the service requester 174 approaches the vehicle of service provider 184. Other distance cues can include sounds that become more frequent, a flashing light, different colored lights, etc. The service requester 174 can use the service requester application 175 to disable the distance cues. The distance cues can also be programmed to cease after a predetermined amount of time has elapsed once the service requester 174 has reached the correct vehicle.

With reference to an example of FIG. 5, a network computer system 100 receives a transport service request from a requester device (510). In some examples, the service request 171 can include a service start location 173 within a given region (e.g., a metropolitan area managed by one or more datacenters corresponding to the network computer system 100) where a matched service provider is to rendezvous with the service requester 174. The service requester 174 can input the service start location 173 by setting a location pin on a user interface of the service requester application 175, or the service start location 173 can be determined by a current location of the service requester 174 (e.g., utilizing location-based resources of the service requester device 170). Additionally, the service requester 174 can input a service destination 172 during or after submitting the service request 171. In an example using transport services, the service requester 174 is a prospective passenger that wants to be picked up at the service start location 173 and dropped off at a destination.

For each transport request, the network computer system 100 can generate a service invitation 132 to fulfill the service request 171 and transmit the service invitation 132 to devices of service providers. In addition to the service invitation 132, the network computer system 100 can transmit requester information 147, such as a name and photograph of the service requester 174. Once a service provider 184 accepts the service invitation 132, then the acceptance input is transmitted back to network computer system 100, which generates and transmits a confirmation of the matched service provider 184 to the service requester 174 via the service requester application 175 on the service requester device 170 (512).

In some aspects, the network computer system 100 includes a proximity alert system 140 to assist service requesters 174 in finding the correct vehicle of the service provider 184 that they are matched with in busy areas that may include many requesters and providers in close proximity. The proximity alert system 140 uses map data, which includes location data for the geographic locations of each of the service requesters 174 and service providers 184 known to the network service, in order to determine proximities.

In some aspects, the geographic locations correspond to location data received from the service requester devices 170 and service provider devices 180, which include mobile phones as well as devices linked to a particular vehicle, such as a stand-alone beacon device placed in the vehicle or a vehicle-based infotainment or navigation system (514). The location data can be latitude and longitude coordinates determined by a single method or combination of methods, including the use of global navigation satellite system units, cellular triangulation, and WiFi location techniques, among others.

In one aspect, the proximity alert system 140 attempts to determine whether a rider/driver mismatch has occurred based on relative movement speeds between the two parties. The proximity alert system 140 tracks or periodically monitors the geographic locations of service requesters 174 and service providers 184 over time in order to determine their respective movement speeds (516). After the service provider 185 arrives at the designated pick up location, it is expected that neither party will move very quickly until the rider is in the vehicle, after which point both parties should move at substantially identical speeds.

Once the proximity alert system 140 determines that the service requester 174 and service provider 184 are at the service start location 173, the proximity alert system monitors the movement speeds of both parties to determine whether the service requester 174 movement speed is different than the service provider 184 movement speed by a threshold amount (e.g., 20 miles per hour) (518).

If so, the proximity alert system 140 generates a notification 139 to the service requester 174 indicating that the service requester 174 may be riding in a vehicle belonging to someone other than the correct service provider 185 who is assigned to the requester's service request 171 (520). The network computer system 100 can transmit the notification 139 over the network 160 to the service requester device 170 to cause the service requester application 175 to display a notification message on the user interface of the application. In some examples, the message can inform the service requester 174 that they may be riding in an incorrect vehicle and that they should confirm whether or not this is the case. For example, the message may ask the rider "Are you sure you're in the right car?" The message can also include details of the service request 171 that the service requester 174 can use as part of the confirmation process, including the name of the service provider 184, a photo of the service provider 184, and vehicle details such as the make, model, color, and license plate number of the vehicle. In addition to the notification message, the service requester application 175 can display an interactive prompt that allows the service requester 174 to select whether or not they have entered an incorrect vehicle.

If the service requester 174 indicates that no mistake has occurred, the service requester application 175 can log the false alarm and transmit the log back to the network computer system 100.

When the service requester 174 indicates that they are riding in an incorrect vehicle, the service requester device 170 transmits, either through an application programming interface or a text message, that indication back to the network computer system 100 for processing. In one implementation, in response to receiving the indication that the rider has the wrong vehicle, the network computer system 100 can transmit another notification 139 to the incorrectly-matched service provider 184 informing them that the person in their vehicle may not be the passenger they were supposed to pick up. The notification 139 sent to the service provider 184 can also include details of the service request 171 that the service provider 184 can use as part of a second confirmation process, including the name of the service requester 174 and a photo of the service requester 174.

The service requester application 175 can display a list of remedial actions that the service requester 174 can take, including canceling the service request 171 or notifying the appropriate authorities if necessary. If a mistake has occurred, the service provider application 185 can direct the driver of the vehicle to return the service requester 174 to the service start location 173 so that the service requester 174 can get in the correct vehicle and the driver can pick up the correct passenger. In addition, the network computer system 100 can send notifications 139 to (a) the correct service provider 184 informing them that their rider got into the wrong vehicle, and/or (b) the service requester 174 that driver was supposed to pick up informing them that their driver picked up the wrong passenger.

Service Provider Device

Figure 6:
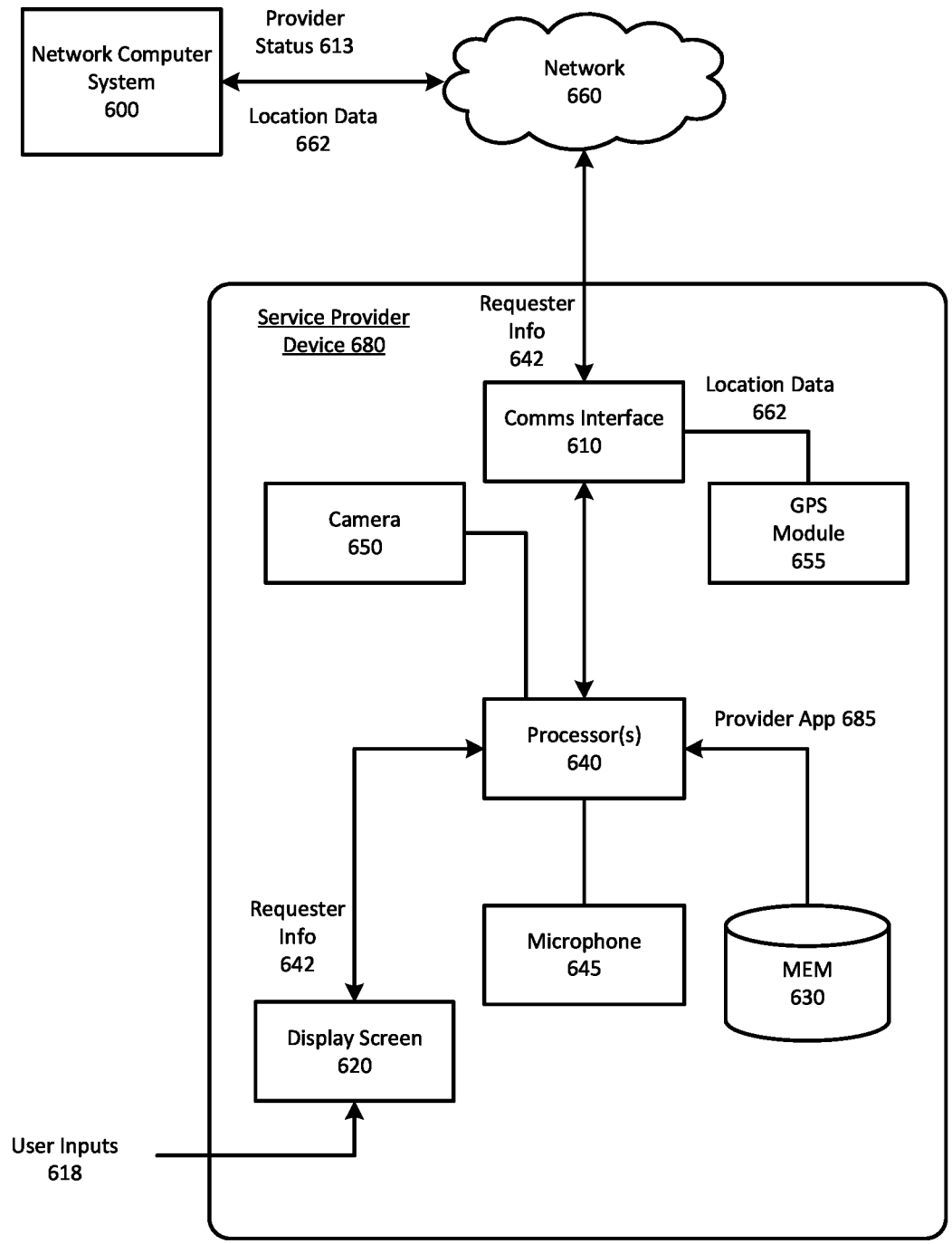
FIG. 6 is a block diagram illustrating an example computing device executing a designated service application for communicating with a network computer system, according to examples described herein.

FIG. 6 is a block diagram illustrating an example service provider device executing a designated service provider application for an on-demand service, as described herein. In many implementations, the service provider device 680 can comprise a mobile computing device, such as a smartphone, tablet computer, laptop computer, VR or AR headset device, and the like. As such, the service provider device 680 can include typical telephony features such as a microphone 645, a camera 650, and a communication interface 610 to communicate with external entities using any number of wireless communication protocols. In certain aspects, the service provider device 680 can store a designated application (e.g., a service provider application 632) in a local memory 630. In many aspects, the service provider device 680 further stores information corresponding to a contacts list 634 and calendar appointments 636 in the local memory 630. In variations, the memory 630 can store additional applications executable by one or more processors 640 of the service provider device 680, enabling access and interaction with one or more host servers over one or more networks 660.

In response to a user input 618, the service provider application 632 can be executed by a processor 640, which can cause an application interface to be generated on a display screen 620 of the service provider device 680. The application interface can enable the service provider to, for example, check current price levels and availability for the on-demand arrangement service. In various implementations, the application interface can further enable the service provider to select from multiple ride service types, such as a carpooling service type, a regular ride-sharing service type, a professional ride service type, a van on-demand service type, a luxurious ride service type, and the like.

As provided herein, the service provider application 632 can further enable a communication link with a network computer system 600 over the network 660, such as the network computer system 100 as shown and described with respect to FIG. 1. Furthermore, as discussed herein, the service provider application 632 can display requester information 642 on the application interface that includes data regarding a service requester so that the provider can choose whether to accept or reject a service invitation received from the network computer system 600. The display screen 620 can also be used to display various notifications regarding proximity alerts.

The processor 640 can transmit the provider status 613 (i.e., modes the provider is in) via a communications interface 610 to the backend network computer system 600 over a network 660. In various examples, the service provider device 680 can further include a GPS module 655, which can provide location data 662 indicating the current location of the provider to the network computer system 600. In alternative aspects, hard-wired circuitry may be used in place of or in combination with software instructions to implement aspects described herein. Thus, aspects described are not limited to any specific combination of hardware circuitry and software.

Computer System

Figure 7:
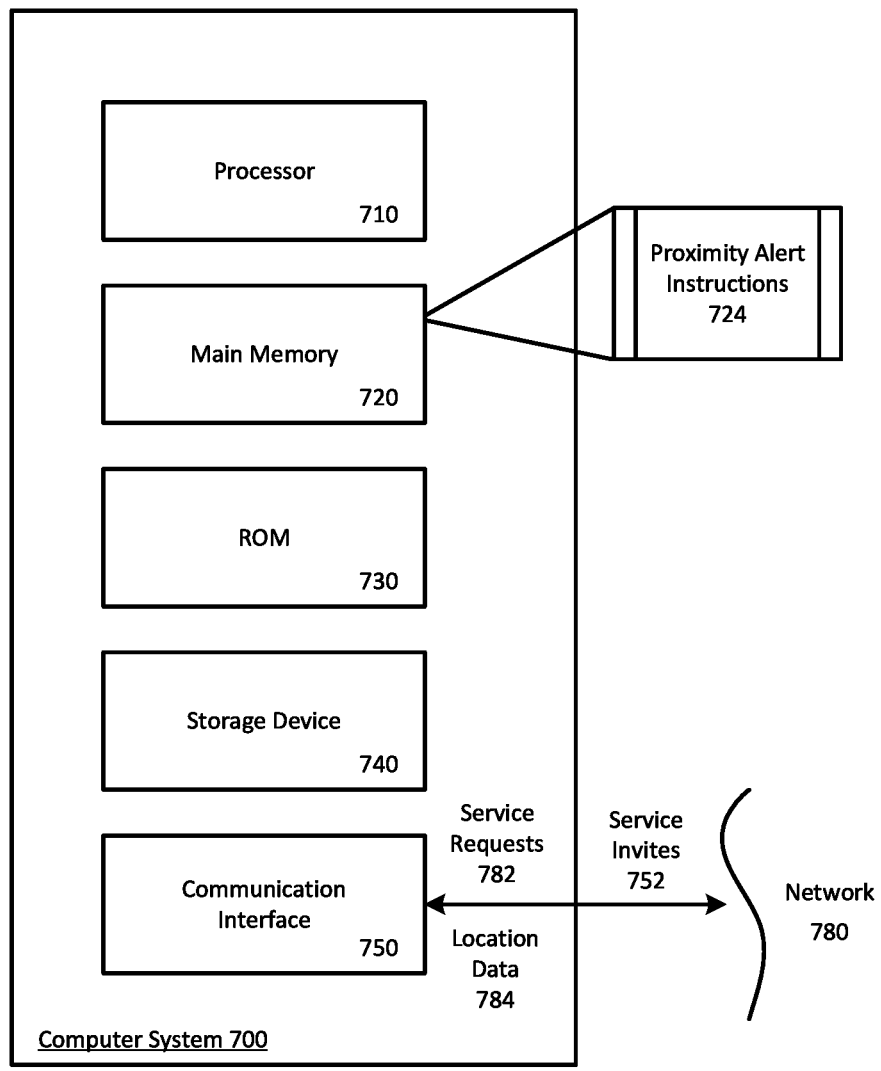
FIG. 7 is a block diagram that illustrates a computer system upon which aspects described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service for providing service services. In the context of FIG. 1, the network computer system 100 may be implemented using a computer system 700 as described by FIG. 7. The network computer system 100 may also be implemented using a combination of multiple computer systems as described by FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices, one or more servers, and/or one or more self-driving vehicles. In accordance with examples, the computer system 700 receives service requests 782 from mobile computing devices of individual users. The executable instructions stored in the memory 730 can include proximity alert instructions 724, which the processor 710 executes to determine whether to send various notifications and cues to requesters and/or providers.

By way of example, the instructions and data stored in the memory 720 can be executed by the processor 710 to implement an example network computer system 100 of FIG. 1. In performing the operations, the processor 710 can receive service requests 782 and location data 784 and submit service invitations 752 to facilitate fulfilling the service requests 782.

The processor 710 is configured with software and/or other logic to perform one or more processes, steps and other functions described with implementations, such as described by FIGS. 1 through 6, and elsewhere in the present application.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network computer system comprising:
a memory resource to store instructions; and
one or more processors using the instructions stored in the memory resource to perform operations including:
receiving, over one or more networks, data corresponding to a plurality of transport requests from a plurality of user devices, the plurality of transport requests including a first transport request from a user device of a first user;
assigning a first driver operating a first vehicle to provide a transport service for the first user;
receiving, over the one or more networks, user location data from the user device of the first user, the user location data corresponding to a geographic location of the user device over time as determined by a location-aware resource of the user device;
receiving, over the one or more networks, driver location data corresponding to a geographic location over time for at least a first driver device of the first driver and a second driver device of a second driver operating a second vehicle to provide a transport service for a second user, wherein the second driver is not matched to the first user;
receiving near-field communication (NFC) data from both the second driver device and the user device of the first user, the NFC data indicating that a threshold proximity between the second driver and the first user has been crossed without a global reference frame; and
based on the NFC data, transmitting a proximity alert to the user device of the first user, the proximity alert indicating that the first user is about to enter an incorrect vehicle for receiving the transport service.

2. The network computer system of claim 1, wherein transmitting the proximity alert to the user device of the first user comprises providing a distance cue that indicates a proximity of the user device to the first driver device.

3. The network computer system of claim 2, wherein providing the distance cue includes changing an intensity of an audible or a vibrational alert based on a proximity of the user device to the first driver device.

4. The network computer system of claim 2, wherein providing the distance cue includes changing a frequency of an audible or a vibrational alert based on a proximity of the user device to the first driver device.

5. The network computer system of claim 1, wherein transmitting the proximity alert to the user device of the first user includes providing an audible or a vibrational alert that the second driver is an incorrect driver for the user's transport request.

6. The network computer system of claim 1, wherein the proximity alert transmitted to the user device of the first user causes the user device to display information about the first vehicle of the first driver.

7. The network computer system of claim 1, wherein transmitting the proximity alert to the user of the first device includes providing information that facilitates identification of the first vehicle of the first driver.

8. The network computer system of claim 1, wherein the operations include performing one or more remedial actions upon determining that the user has entered the incorrect vehicle.

9. The network computer system of claim 1, wherein each of the first driver device and the second driver device are within a threshold distance of the user device.

10. A non-transitory computer-readable medium that stores instructions, that when executed by one or more processors of a computer system, cause the computer system to perform operations that comprise:
   receiving, over one or more networks, data corresponding to a plurality of transport requests from a plurality of user devices, the plurality of transport requests including a first transport request from a user device of a first user;
   assigning a first driver operating a first vehicle to provide a transport service for the first user;
   receiving, over the one or more networks, user location data from the user device of the first user, the user location data corresponding to a geographic location of the user device over time as determined by a location-aware resource of the user device;
   receiving, over the one or more networks, driver location data corresponding to a geographic location over time for at least a first driver device of the first driver and a second driver device of a second driver operating a second vehicle to provide a transport service for a second user, wherein the second driver is not matched to the first user;
   receiving near-field communication (NFC) data from both the second driver device and the user device of the first user, the NFC data indicating that a threshold proximity between the second driver and the first user has been crossed without a global reference frame
   based on the NFC data, transmitting a proximity alert to the user device of the first user, the proximity alert indicating that the first user is about to enter an incorrect vehicle for receiving the transport service;
   transmitting, over the one or more networks, a notification to the user device of the first user, the notification including code to confirm whether the first user will enter or has entered the first vehicle of the first driver; and
   receiving, over the one or more networks, a reply to the notification from the user device of the first user, the reply indicating that the first user has entered the first vehicle of the first driver.

11. The non-transitory computer-readable medium of claim 10, wherein transmitting the proximity alert to the user device of the first user comprises providing a distance cue that indicates a proximity of the user device to the first driver device.

12. The non-transitory computer-readable medium of claim 11, wherein providing the distance cue includes providing an audible or a vibrational alert that the second driver is an incorrect driver for the user's transport request.

13. The non-transitory computer-readable medium of claim 11, wherein transmitting the proximity alert to the user device of the first user includes providing an audible or a vibrational alert that the second driver is an incorrect driver for the user's transport request.

14. The non-transitory computer-readable medium of claim 11, wherein providing the distance cue includes changing a frequency of an audible or a vibrational alert based on the proximity of the user device to the first driver device.

15. The non-transitory computer-readable medium of claim 10, wherein the proximity alert transmitted to the user device of the first user causes the user device to display information about the first vehicle of the first driver.

16. The non-transitory computer-readable medium of claim 10, wherein transmitting the proximity alert to the user of the first device includes providing information that facilitates identification of the first vehicle of the first driver.

17. The non-transitory computer readable medium of claim 10, wherein the operations include performing one or more remedial actions upon determining that the user has entered the incorrect vehicle.

18. The non-transitory computer readable medium of claim 10, wherein each of the first driver device and the second driver device are within a threshold distance of the user device.

19. A method for operating a network computer system, the method comprising:
   receiving, over one or more networks, data corresponding to a plurality of transport requests from a plurality of user devices, the plurality of transport requests including a first transport request from a user device of a first user;
   assigning a first driver operating a first vehicle to provide a transport service for the first user;
   receiving, over the one or more networks, user location data from the user device of the first user, the user location data corresponding to a geographic location of the user device over time as determined by a location-aware resource of the user device;
   receiving, over the one or more networks, driver location data corresponding to geographic location over time for at least a first driver device of the first driver and a second driver device of a second driver operating a second vehicle to provide a transport service for a second user, wherein the second driver is not matched to the first user;
   receiving near-field communication (NFC) data from both the second driver device and the user device of the first user, the NFC data indicating that a threshold proximity between the second driver and the first user has been crossed without a global reference frame;
   based on the NFC data, transmitting a proximity alert to the user device of the first user, the proximity alert indicating that the first user is about to enter an incorrect vehicle for receiving the transport service;
   transmitting, over the one or more networks, a notification to the user device of the first user, the notification including code to confirm whether the first user will enter or has entered the first vehicle of the first driver; and
   receiving, over the one or more networks, a reply to the notification from the user device of the first user, the reply indicating that the first user has entered the first vehicle of the first driver.

20. The method of claim 19, wherein transmitting the proximity alert to the user device of the first user comprises providing a distance cue that indicates a proximity of the user device to the first driver device.

21. The method of claim 19, wherein transmitting the proximity alert to the user device of the first user includes providing an audible or a vibrational alert that the second driver is an incorrect driver for the user's transport request.

22. The method of claim 19, wherein the proximity alert transmitted to the user device of the first user causes the user device to display information about the first vehicle of the first driver.

23. The method of claim 19, further comprising performing one or more remedial actions upon determining that the user has entered the incorrect vehicle.

24. The method of claim 19, wherein each of the first driver device and the second driver device are within a threshold distance of the user device.

\* \* \* \* \*